United States Patent
Benyoub

(10) Patent No.: US 10,118,202 B2
(45) Date of Patent: Nov. 6, 2018

(54) METHOD OF SORTING POSTAL ARTICLES INTO A SORTING FRAME WITH THE SORTED ARTICLES BEING COUNTED AUTOMATICALLY

(71) Applicant: SOLYSTIC, Bagneux (FR)

(72) Inventor: Belkacem Benyoub, Palaiseau (FR)

(73) Assignee: SOLYSTIC, Bagneux (FR)

( * ) Notice: Subject to any disclaimer, the term of this patent is extended or adjusted under 35 U.S.C. 154(b) by 0 days.

(21) Appl. No.: 14/765,789

(22) PCT Filed: Apr. 15, 2015

(86) PCT No.: PCT/FR2015/051026
§ 371 (c)(1),
(2) Date: Mar. 20, 2017

(87) PCT Pub. No.: WO2016/012675
PCT Pub. Date: Jan. 28, 2016

(65) Prior Publication Data
US 2017/0203335 A1    Jul. 20, 2017

(30) Foreign Application Priority Data
Jul. 21, 2014  (FR) ...................................... 14 57018

(51) Int. Cl.
*B07C 7/00* (2006.01)
*G06K 9/62* (2006.01)
*G06K 9/18* (2006.01)

(52) U.S. Cl.
CPC ................ *B07C 7/005* (2013.01); *G06K 9/18* (2013.01); *G06K 9/6255* (2013.01)

(58) Field of Classification Search
CPC .... B07C 3/00; B07C 3/18; B07C 5/34; B07C 5/342; B07C 7/005; G06K 9/18; G06K 9/20
(Continued)

(56) References Cited

U.S. PATENT DOCUMENTS 5,794,789 A * 8/1998 Payson ..................... B07C 3/00
                                                              209/549
6,539,098 B1 * 3/2003 Baker ...................... B07C 3/20
                                                              209/584
(Continued)

FOREIGN PATENT DOCUMENTS

DE         20218212 U1    12/2003
WO       2014-057185 A1    4/2014

OTHER PUBLICATIONS

French Search Report dated Mar. 10, 2015, for Application No. 1457018.

*Primary Examiner* — Joseph C Rodriguez
*Assistant Examiner* — Kalyanavenkateshware Kumar
(74) *Attorney, Agent, or Firm* — Patterson & Sheridan, LLP

(57) ABSTRACT

A method of sorting postal articles into a postal sorting frame comprising sorting slots, in which method said articles to be sorted are placed in a stack, and the articles are taken one-by-one from the top of the stack so as to place each of them in a sorting slot, and digital images of the top of the stack are formed automatically at a certain rate, is characterized by the following steps: a) recording said digital images in the memory of a data-processing unit; b) mutually comparing said digital images on the basis of a certain graphical resemblance criterion, so as to form image models, each of which is representative of similar-looking digital images; c) associating each image model with a persistence time; and d) applying a time filter to said image models so as to eliminate those models whose persistence time is less than a certain threshold value, the remaining number of models serving to count the sorted postal articles automatically.

4 Claims, 2 Drawing Sheets

(58) Field of Classification Search
USPC .................. 209/583, 584, 702, 703, 900; 700/223–227
See application file for complete search history.

(56) References Cited

U.S. PATENT DOCUMENTS

| | | | |
|---|---|---|---|
| 6,878,896 B2* | 4/2005 | Braginsky | B07C 7/005 209/546 |
| 2013/0243324 A1* | 9/2013 | King | G06F 17/30011 382/176 |
| 2015/0209832 A1* | 7/2015 | Miette | B07C 7/005 209/549 |

* cited by examiner

METHOD OF SORTING POSTAL ARTICLES INTO A SORTING FRAME WITH THE SORTED ARTICLES BEING COUNTED AUTOMATICALLY

TECHNICAL FIELD

The invention relates to a method of sorting articles into a sorting frame provided with sorting slots.

The term "postal article" means any type of postal article that can have a variety of dimensions, and that can also have a variety of physical characteristics. Such postal articles may, inter alia, be an ordinary letter, a postcard, a magazine, an envelope with or without a window, a newspaper, or indeed a catalog or a parcel.

PRIOR ART

Sorting postal articles into sorting frames has been in existence for a long time, in particular in post offices.

Ordinarily, the sorting is done manually by an experienced operator who firstly puts the postal articles to be sorted in a container, and then takes the articles one-by-one, reads the destination address of each postal article as it is taken, and places it in a sorting slot of the sorting frame, which slot corresponds to said destination address.

The sorting frame that is generally placed on a desk in front of the operator may have its sorting slots aligned in rows and columns in a two-dimensional matrix configuration.

Once the sorting is finished, the sorted postal articles can be retrieved directly from the sorting slots of the sorting frame in sequenced manner, e.g. for preparing a delivery round or "postman's walk", or indeed they can be transferred to another piece of sorting apparatus in order to perform finer sorting.

Nowadays, time constraints and the increasing number of postal articles are encouraging postal authorities to find technical means for making such manual sorting into sorting frames faster and more reliable.

Patent Document FR 2 996 789 discloses an aid for assistance in sorting into a sorting frame, that aid consisting in placing said articles to be sorted in a stack, in taking them one-by-one from the top of the stack, and in automatically forming digital images of the top of the stack at a certain rate. Since the image of the top of the stack is the image of an article to be sorted that includes a sorting indication placed on the article to be sorted, it is possible, on the basis of the digital image of that article, to produce, automatically, an identification signal designating a sorting slot of the sorting frame, into which sorting slot the article to be sorted should be placed.

In such a system for assistance in sorting into a sorting frame, it is possible to form five images per second, whereas an article is taken from the top of the stack in the range every 3 seconds to every 10 seconds.

As a result, it is possible to have a large number of images for the same article taken from the top of the stack.

In addition, the operator can put an article that has just been taken back onto the top of the stack, e.g. due to a handling error. It is also possible for the operator to put the article back onto the top of the stack while changing its orientation relative to the orientation it had before being taken from the top of the stack.

In a postal sorting machine with a sorting conveyor that automatically directs each mailpiece unstacked at the inlet of the machine to a sorting outlet that corresponds to the postal address on the article, a single digital image is formed of that postal article so as to evaluate the postal address by optical character recognition (OCR), and that image, together with the results of the OCR evaluation, are stored in an image base that can serve for on-line or off-line video-coding if the result of the address evaluation is dubious.

Those various items of data associated with the sorted articles in that type of machine make it possible to count the sorted articles accurately, to record a history of the processing of the articles for detecting operating errors, and also to compile statistics relating, in particular, to the rate of recognition of the addresses on the postal articles as a function of the physical characteristics of the images of the automatically machine-sorted articles or of the sorting destinations.

When sorting into a sorting frame with a specific system for assistance in sorting into the frame, in which system digital images of the sorted articles are formed as indicated above, it is necessary for the articles sorted into the sorting frame to be counted reliably and automatically, without any specific action being required of the operator, and for a single image with its attributes to be associated with each physical postal article in the same way as for a postal sorting process in a machine having a sorting conveyor for automatically sorting into sorting outlets.

There is also a need to merge the results of the OCR evaluation that are obtained in a postal sorting machine having a sorting conveyor with those obtained in a postal sorting system for sorting into a sorting frame, for the purpose of recording a history of the processing of all of the sorted articles, it being necessary for that history to be designed so that it is possible to find each article by means of its digital image and of its attributes.

An object of the invention is therefore to satisfy those needs.

To this end, the invention provides a method of sorting postal articles into a postal sorting frame comprising sorting slots, in which method the articles to be sorted are placed in a stack, and the articles are taken one-by-one from the top of the stack so as to place each of them in a sorting slot, and digital images of the top of the stack are formed automatically at a certain rate, said method being characterized in that it further comprises the following steps:

a) recording the digital images in the memory of a data-processing unit;

b) mutually comparing the digital images on the basis of a certain graphical resemblance criterion, so as to form image models, each of which is representative of one or more successive digital images that are similar-looking;

c) associating each image model with data indicating a persistence time; and d) applying a time filter to the image models so as to eliminate those models whose persistence time is less than a certain threshold value, the remaining image models serving as a basis for automatically counting the sorted postal articles that are sorted in the slots of the frame.

The basic idea of the invention is thus to have an image rate that is much higher than the normal rate the articles are taken from the top of the stack by the operator, so as to group together mutually similar images in image models, and then to prune the image models by taking account of their persistence times.

More particularly, the idea is that the grouping together of the images is based on a combination of a plurality of different resemblance criteria in order to highlight the slightest change of article at the top of the stack of postal articles and in order to decide to create a new image model even if it is then eliminated subsequently during the processing of the images.

It can be considered that each postal article remains at the top of the stack of articles for approximately in the range 3 seconds to 10 seconds before it is taken by the operator, this time depending on the handling by the operator. The image rate of the digital images produced by the camera is 4 to 5 images per second, which means that an article on the top of the stack can generate from 15 to 50 digital images.

It can thus be assumed that an image model is ephemeral if it is constructed with very few successive digital images that are similar-looking, e.g. two images, corresponding to a period of 400 milliseconds (ms) if an image rate of 5 images per second is considered.

The basic idea of the invention stems from the principle that such an ephemeral model is not representative of a postal article per se in the process of sorting into the frame because, in this process, the operator cannot take a postal article from the top of the stack in such a short time. This type of ephemeral model can correspond to postal article images formed at the time at which the hand of the operator is passing between the camera and the top of the stack of postal articles.

With this pruning of digital image models, it is possible to obtain a list of image models that are actually images produced by the camera that correspond respectively and reliably to the postal articles taken and sorted into the slots of the sorting frame even in situations of handling errors where an article taken from the stack is put back onto the top of the stack by the operator.

This pruning can be reinforced by mutually comparing image signatures having postal and graphical components, these image signatures being unique identifiers for images of postal articles bearing delivery addresses.

The method of the invention may advantageously have the following features:

the graphical resemblance criterion that is used is a combination of a plurality of different graphical resemblance criteria;

an image model is formed on the basis of the most recent digital image among the successive digital images that are similar-looking;

for each current image model, a digital image signature is computed that is made up of a postal component that is representative of the textual characteristics of a postal address, and of a graphical component that is representative of the physical characteristics of a digital image, and in that the signature of the current image model is compared with the signature of a preceding image model, and, if their signatures match, said current and preceding image models are grouped together in the same image model.

BRIEF DESCRIPTION OF THE DRAWINGS

The present invention can be better understood and other advantages appear on reading the following detailed description illustrated by the accompanying drawings, in which.

DESCRIPTION OF EMBODIMENTS

Assistance apparatus, disclosed by Patent Document FR 2 996 789, for assistance in manually sorting articles into a sorting frame is described below by way of non-limiting example for when the articles are flat postal articles on which address information that constitutes sorting information is placed conventionally.

This assistance apparatus may be used in a post office or in a postal sorting center.

Figure 1:
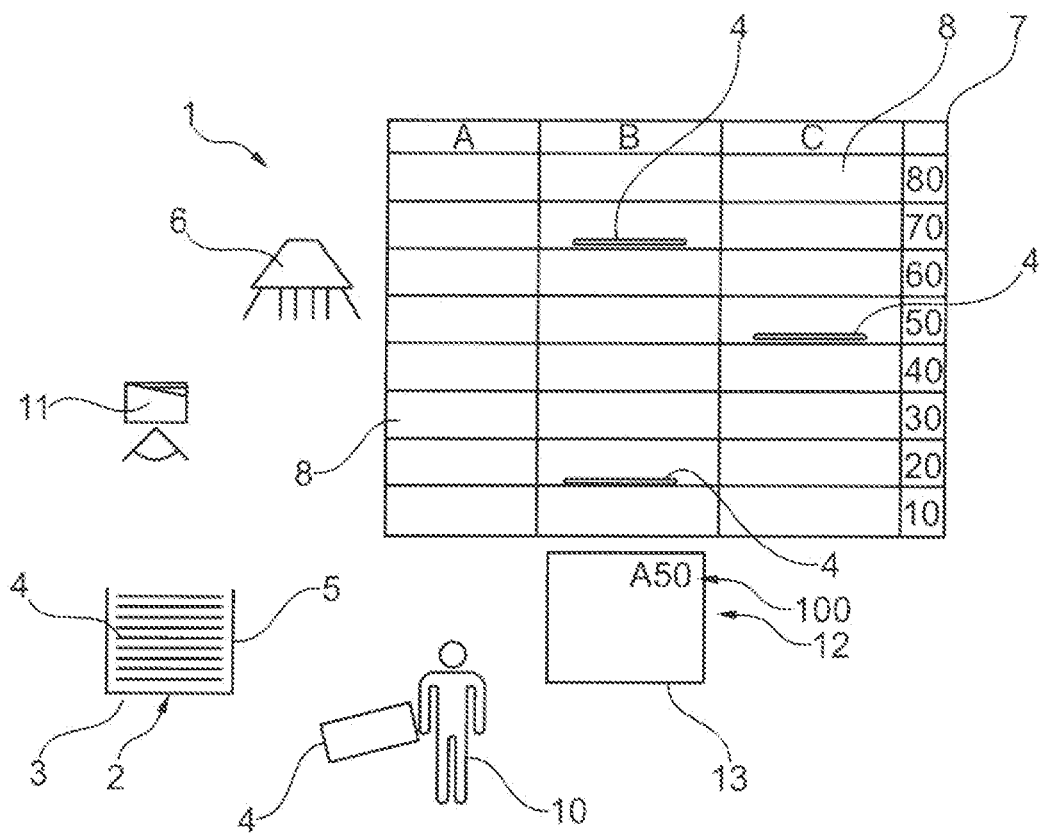
FIG. 1 is a diagrammatic view of apparatus for assistance in sorting postal articles into a sorting frame.

The apparatus 1 for assistance in sorting that is shown in FIG. 1 comprises various elements, including a container 2, lighting 6, image-taking apparatus 11, a monitoring and control unit 12, and a sorting frame 7.

In this example, the container 2 is a storage bin that has a flat bottom 3 and vertical walls 5. The bin is designed to store the postal articles 4 flat and in a vertical stack. The top of the container 2 is open so as to allow an operator indicated by 10 to take the articles 4 one-by-one easily and rapidly from the top of the stack.

In this example, the articles 4 are stored in the container 2 in such a manner that, every time, the article 4 that is at the top of the stack is presented with its face bearing the destination address visible from the outside of the container 2, and, in FIG. 1, visible from the top of the container 2.

The lighting 6 is designed to illuminate homogeneously the articles 4 in the container 2 and more particularly the article 4 at the top of the stack, regardless of the height or the width of the stack.

Thus, in the example shown in FIG. 1, the lighting 6 is disposed above the container 2 so as to ensure that the destination address of the article 4 at the top of the stack can be read properly regardless of the conditions of installation of the apparatus 1 for assistance in sorting, in particular when neon lights or windows are present nearby. The intensity, the color and the position of the light emitted by the lighting 6 could also be adjusted automatically depending on the size of the stack, on the color of the articles 4, or on the lighting conditions of the room in which the apparatus 1 for assistance in sorting is placed.

The sorting frame 7 is provided with a plurality of sorting slots 8 designed to receive one or more articles 4. In particular, the sorting frame 7 is placed facing the operator 10 or at any other place adapted in such a manner that the operator 10 can access the sorting slots 8 quickly and readily. In the example shown in FIG. 1, the sorting frame 7 is disposed next to the container 2 so that, in a single movement of the arm, the operator 10 causes an article 4 to go from the container 2 into one of the sorting slots 8 of the sorting frame 7.

FIG. 1 shows a matrix sorting frame 7. The rows and columns of the sorting frame 7 are, in this example, numbered or referenced by a slot identification code visible by the operator 10, and which, in this example, is a code including a letter indicating a column of the sorting frame 7, e.g. A, B, C, D, etc., and a number indicating a row of the sorting frame 7, e.g. 10, 20, 30, etc.

The image-taking apparatus 11 in the example shown in FIG. 1 is a camera 11 placed above the container 2 so as to take digital images of the article 4 at the top of the stack of articles 4, each digital image then including the destination address on the postal article 4 (except if it is masked by the hand of the operator).

The camera 11 can be designed to form digital images of the top of the stack automatically and at a certain rate, e.g. so as to form four or five digital images per second, throughout the sorting process for sorting into the sorting frame.

The camera 11 is placed at a suitable distance from the stack of articles 4, e.g. at a distance enabling it to have the entire height of the stack of articles 4 in its depth of field, thereby making it possible to ensure that a sharp digital image is taken of each article 4 as the operator 10 takes the articles 4 from the stack so as to place them in the sorting slots 8 of the sorting frame 7.

The monitoring and control unit 12 receives all of the images produced by the camera 11. It has a memory, in which it records the digital images in sequence, in chronological order.

When there are no postal articles in the bin or container 2, the camera 11 forms an image of the bottom of the bin, which bottom is black in this example, i.e. it has an appearance that is very different from the appearance of the postal articles. The unit 12 can thus automatically detect the absence of postal articles in the bin, by comparing a brightness characteristic of the image formed by the camera 11 with a predetermined threshold.

The counting process in the unit 12 can start automatically on detecting a signal input by the operator, e.g. in a radiofrequency identification (RFID) card, or indeed on detecting crossing of a threshold of the brightness characteristic in the images formed by the camera 11 when a stack of postal articles is loaded into the bin. It should be noted that this process of counting the postal articles of the stack can be stopped automatically as soon as the unit 12 detects, once again, that the brightness characteristic is less than said predetermined threshold, and can start again when a new stack of postal articles is loaded into the bin and on detecting crossing of the threshold by said brightness characteristic.

Figure 2:
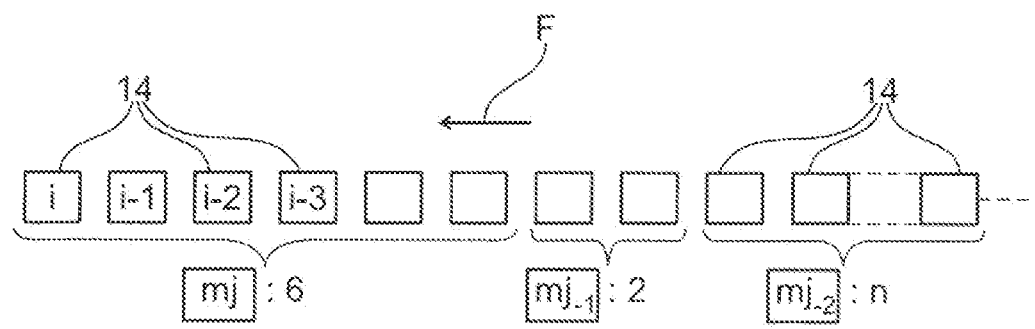
FIG. 2 is a diagram showing how digital images are grouped together in accordance with the invention.

FIG. 2 shows a sequence of digital images 14 formed by the camera 11 in the chronological sequence $i$, i-1, i-2, i-3, etc. and recorded in the memory in the unit 12. The arrow F indicates the chronological direction, the most recent image being on the left of the arrow F, and, in this example, being the image $i$.

In accordance with the invention, these images are compared with one another on the basis of a certain graphical resemblance criterion so as to be grouped together to form a list of image models, each of which is representative of one or more successive digital images that are similar-looking.

Figure 3:
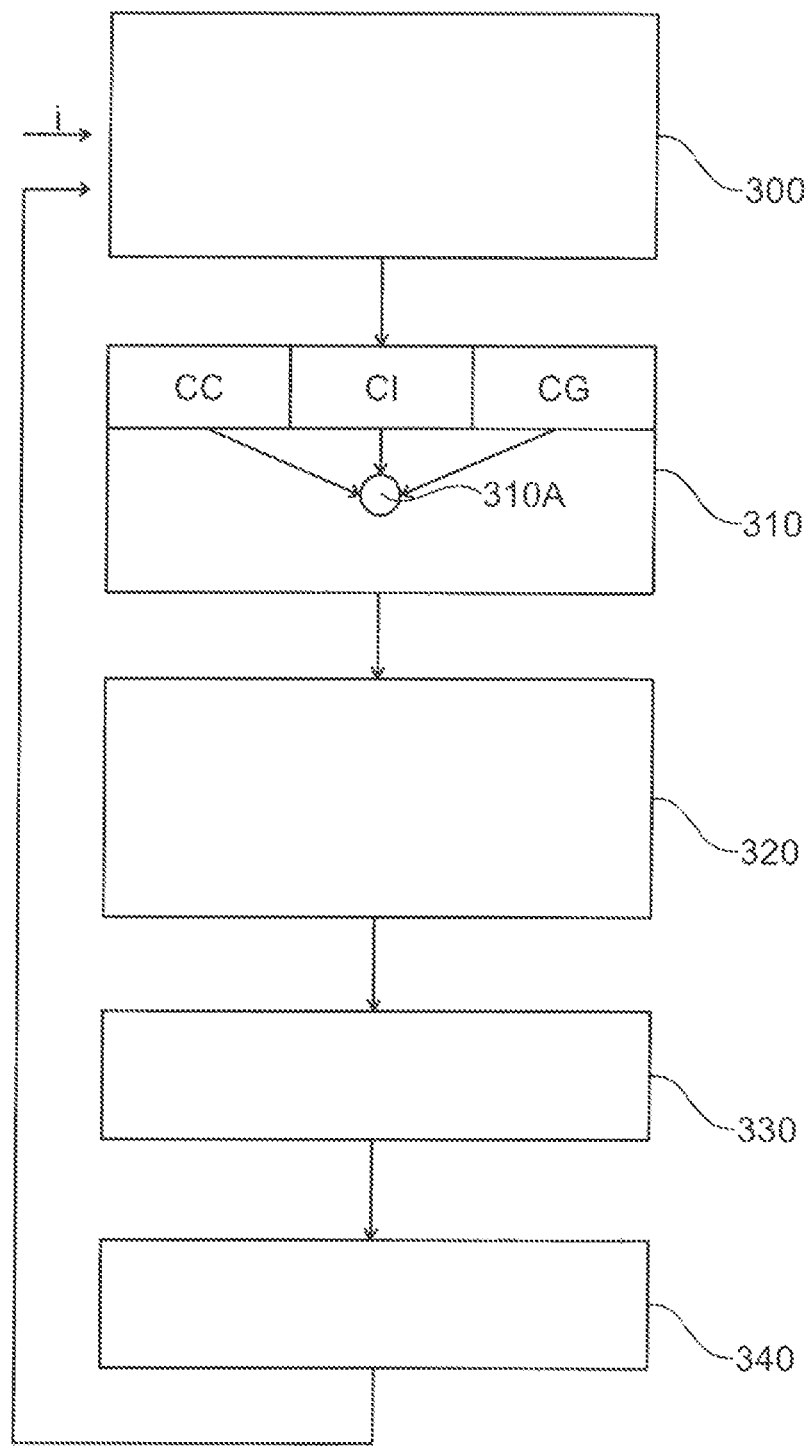
FIG. 3 shows the steps of the method of the invention.

FIG. 3 shows the process of comparing the images with one another.

In step 300, a new image $i$ is formed by the camera 11 and is recorded in the memory in the unit 12. The unit 12 keeps the preceding images i-1, i-2, etc. in the memory.

In accordance with the invention, the graphical resemblance criterion is actually a combination of various graphical resemblance criteria, e.g. a combination of three different algorithms making it possible to determine whether two consecutive images, image $i$ and image i-1 in this example, are sufficiently like each other graphically. The combination may be a majority vote over the three results of the comparison.

As image comparison elements, it is possible to use a correlation of the connected components that is indicated by CC in block 310, or indeed a correlation of the low-resolution images that are indicated by CI in block 310, or indeed a correlation of the graphical classes that is indicated by CG in block 310.

For the correlation of the connected components, firstly the connected components are computed on each binary image $i$ and i-1, and then the connected components are classified by size. For the comparison, it is possible to use only the $\overline{n}$ largest components (n=100), while excluding the components of the edges and the components in the stamp zone. The connected components are compared one-by-one on the basis of size and position criteria.

For correlating the low-resolution images, each image i and i-1 is sub-sampled at low resolution (1 pixel (pix)/millimeter (mm)), and then a projection is effected on the x-axis and on the y-axis. For each image, two signals are obtained, with which correlation is computed.

For the graphical classes, each image i and i-1 is sub-sampled at very low resolution (0.25 pix/mm), and then the image is meshed so as to make it possible to extract a vector of attributes (intensity extrema, mean, standard deviation, entropy, etc.) for each region of the image. The two matrices of vectors of attributes are then compared.

The results of the correlations are thus combined to produce an overall result for resemblance or dissemblance at 310A in block 310.

At 320, if the two consecutive images $i$ and i-1 are similar-looking, the image $i$ is grouped together with the image i-1, and the image $i$ becomes a model mj representative of the images $i$ and i-1 and optionally of the preceding images i-2, i-3, etc., as shown in FIG. 2.

FIG. 2 thus shows three models mj, mj-1 and mj-2 of images, with, in this example, the model mj grouping together 6 consecutive images, the model mj-1 grouping together 2 consecutive images, and the model mj-2 grouping together $\underline{n}$ consecutive images.

These image models are recorded in the memory of the unit 12, each in association with a persistence time which, in this example, corresponds, every time, to the number of successive images grouped together in the corresponding image model.

It is also possible to time stamp each digital image and to compute, by summing, a persistence time for each model of digital images. In this example, the persistence time of the model mj is 6, the persistence time of the model mj-1 is 2, and the persistence time of the model mj-2 is $\underline{n}$.

At 330, in accordance with the invention, in the unit 12, a time filter is applied to the image models, which time filter consists in eliminating an old model that chronologically precedes the creation of a new model if the persistence time of said old model is less than a certain threshold value, which value may be parameterizable as a function of the rate at which images 14 are taken by the camera 11. For example, if the threshold is 2, then the model nj-1 is eliminated from the list of the models of digital images formed in block 320.

The process then loops back to block 300 for a new image formed by the camera 11.

As can be understood, each image model is constituted by an image taken in the sequence of the images of the model, and, in this example, that image is preferably the most precocious in the sequence.

FIG. 1 shows the mechanism for assistance in sorting into the frame, in which mechanism each time an image is produced by the camera 11, at 300, automatic address evaluation is performed in the unit 12 via an OCR system and via a postal address base as is well known for postal sorting machines.

A sorting plan has been recorded in the unit 12, which sorting plan is an associative table that associates destination addresses with the sorting slots 8 of the sorting frame 7. On the basis of the destination address recognized in the image of an article 4 and of the sorting plan, the unit 12 can determine the sorting slot 8 of the sorting frame 7 in which the article 4 is to be placed, and can thus produce an identification signal 100 on a display screen 13 of the unit 12, which signal designates the location of said sorting slot 8 in the sorting frame 7.

In the example shown in FIG. 1, the identification signal 100 is a visual signal in the form of a concatenation of a row identifier (A in this example) and of a column identifier (50 in this example) of the frame. It can be understood that each time an article 4 is taken from the top of the stack in the container 2, the unit 12 generates a new identification signal 100.

The pruning of the image models by the time filter in block 330 of FIG. 3 may be followed at 340 by grouping models together so as to eliminate further duplicates from the remaining models that might appear, for example, if the operator puts an article back onto the stack just after taking it for the first time.

Processing in block 340 uses a digital image signature having two distinct components, e.g. an image component that is representative of the physical characteristics of the image of the model and a postal component that is representative of the lexical characteristics of the postal address recognized in block 300 for the image of the model in question.

For example, the image component is extracted by statistical analysis of the luminance of the points of the digital image that has previously undergone a succession of filtering operations that lower the level of resolution of the image in order to reduce the processing time for the statistical analysis, and in order to have content of the low-frequency type that is insensitive to fluctuations in luminance during multiple acquisitions. The luminance of a point of the image corresponds to the gray scale value of the point of the image.

On the basis of the low-resolution digital image of a mailpiece, the unit 12 uses computation to extract global attributes representative of global physical characteristics of the image such as the mean luminance value of the points of the digital image, standard deviation, or entropy of the luminance values. It is also possible to use computation to extract local attributes representative of local physical characteristics of the images taken on distinct portions of the digital image. The digital image may be subdivided into a plurality of distinct portions coming from different gridding or meshing in the digital image. The number of distinct portions in a grid and the number of grids may be a parameter of the statistical analysis that is applied to the digital image to extract the image component of the signature. On the basis of each portion of the digital image coming from a grid, it is possible to extract local attributes such as the mean luminance value of the points of that portion of the digital image, the standard deviation, or the entropy of the luminance values in said portion of the digital image. The more said mailpieces are heterogeneous, the greater the discriminating power of the information in said local attributes. All of the global and local attributes extracted for a digital image thus constitute the image component of the signature.

The postal component of the signature may firstly indicate the spatial positions of the information blocks such as the destination address block in which the OCR is performed. The postal component of the signature is also representative of the textual characteristics of said destination address block. A textual description of an information block may consist in an indication of the number of lines of characters detected in the information block, the number of words detected in each line of characters, or the number of characters detected in each word of each line of characters.

The construction of a signature having two distinct components thus uses the fact that a digital image of a mailpiece is a two-dimensional signal that is interpretable and that has content that can be understood both physically and symbolically.

Thus, in block 340 of FIG. 3, for each model, e.g. the model mi, the unit 12 computes image and postal components and compares, in pairs, the two components of the signatures of the current model mi with the components of the models that precede it chronologically after time filtering, in this example mj-2, and groups together the two compared models when the two signatures match. The same applies between the model mj and the models (not shown in the figures) that are chronologically previous to mj-2.

As a result, at the end of the sorting process for sorting into the frame, the unit 12 contains, in its memory, a list of remaining image models that are representative of respective ones of the postal articles 4 that are actually sorted into the frame 7.

The number of models in the list thus makes it possible to count, by automatic counting, the number of articles processed in the sorting process for sorting into the frame.

A unique identifier of a postal article presented in the sorting frame is assigned to each of the remaining models. This association of an image (model of an image) with a physical article makes it possible to do all of the equivalent processing existing for automatic postal sorting machines, e.g. online or offline video-coding, and sorting in a plurality of sorting passes, while benefiting, every time, from the results of the preceding passes.

This processing data for processing of postal articles that are not machine-sortable can be integrated and merged with processing data resulting from sorting machine-sortable postal articles in a postal sorting machine with a postal sorting conveyor in an overall information system for operational production management of machine-sortable postal articles with non-machine-sortable postal articles. As a result, it is then possible to establish statistics on overall processing of such machine-sortable and non-machine sortable postal articles.

The sorting method of the invention for sorting into a sorting frame may be used in sorting in one pass or in a plurality of sorting passes.

Naturally, the present invention is in no way limited to the above description, which can undergo modifications without going beyond the ambit of the invention.

The invention claimed is:

1. A method of sorting postal articles into a postal sorting frame comprising sorting slots, in which method said articles to be sorted are placed in a stack, and the articles are taken one-by-one from the top of the stack so as to place each of them in a sorting slot, and digital images of the top of the stack are formed automatically at a certain rate, said method including the following steps:
   a) recording said digital images in the memory of a data-processing unit;
   b) mutually comparing said digital images on the basis of a certain graphical resemblance criterion, so as to form image models, each of which is representative of one or more successive digital images that are similar-looking;
   c) associating each image model with data indicating a persistence time; and
   d) applying a time filter to said image models so as to eliminate those models whose persistence time is less than a certain threshold value, the remaining image models serving as a basis for automatically counting the sorted postal articles that are sorted in the slots of the frame.

2. A method according to claim 1, wherein the graphical resemblance criterion that is used is a combination of a plurality of different graphical resemblance criteria.

3. A method according to claim 1, wherein an image model is formed on the basis of the most precocious digital image among said successive digital images that are similar-looking.

4. A method according to claim 1, wherein, for each current image model, a digital image signature is computed that is made up of a postal component that is representative of the textual characteristics of a postal address, and of a graphical component that is representative of the physical characteristics of a digital image, and in that the signature of the current image model is compared with the signature of a preceding image model, and, if their signatures match, said current and preceding image models are grouped together in the same image model.

* * * * *